US011204702B2

(12) United States Patent
Kolesnik et al.

(10) Patent No.: US 11,204,702 B2
(45) Date of Patent: Dec. 21, 2021

(54) STORAGE DOMAIN GROWTH MANAGEMENT

(71) Applicant: Red Hat Israel, Ltd., Raanana (IL)

(72) Inventors: Michael Kolesnik, Raanana (IL); Mordechay Asayag, Raanana (IL)

(73) Assignee: Red Hat Israel, Ltd., Raanana (IL)

( * ) Notice: Subject to any disclaimer, the term of this patent is extended or adjusted under 35 U.S.C. 154(b) by 0 days.

(21) Appl. No.: 15/678,001

(22) Filed: Aug. 15, 2017

(65) Prior Publication Data
US 2019/0056877 A1 Feb. 21, 2019

(51) Int. Cl.
*G06F 3/06* (2006.01)
*G06F 9/455* (2018.01)
*H04L 12/26* (2006.01)
*G06F 12/02* (2006.01)
*H04L 12/24* (2006.01)
*G06F 9/50* (2006.01)
*G06F 16/13* (2019.01)

(52) U.S. Cl.
CPC .......... *G06F 3/0631* (2013.01); *G06F 3/0607* (2013.01); *G06F 3/0647* (2013.01); *G06F 9/45558* (2013.01); *G06F 9/5072* (2013.01); *G06F 12/023* (2013.01); *H04L 41/0896* (2013.01); *H04L 41/5025* (2013.01); *H04L 43/0817* (2013.01); *H04L 43/16* (2013.01); *G06F 3/067* (2013.01); *G06F 16/13* (2019.01); *G06F 2009/45583* (2013.01)

(58) Field of Classification Search
CPC ....... G06F 9/45558; G06F 2009/45595; G06F 2009/4557; G06F 9/5077; G06F 3/067; G06F 2009/45583; G06F 3/0647; G06F 3/0631; G06F 9/5072; G06F 16/13; G06F 3/0607; G06F 12/023; H04L 67/1097; H04L 41/0896; H04L 43/0817; H04L 43/16; H04L 41/5025
USPC ..................................................... 711/154, 6
See application file for complete search history.

(56) References Cited

U.S. PATENT DOCUMENTS 7,484,208 B1 * 1/2009 Nelson ................ G06F 9/45558
718/1
8,443,077 B1 5/2013 Lappas et al.
(Continued)

OTHER PUBLICATIONS

Oracle Flash Storage System: Administrator's Guide, Mar. 2015, http://docs.oracle.com/cd/E57980_15/E52309_07/E52309_07.pdf.
(Continued)

*Primary Examiner* — Hashem Farrokh
(74) *Attorney, Agent, or Firm* — Lowenstein Sandler LLP

(57) ABSTRACT

A host system executing multiple virtual machines that is associated with multiple storage domains may be identified. Storage domain data may be received that includes utilization of each of the multiple storage domains by the multiple virtual machines. It may be determined that the utilization of a first storage domain of the multiple storage domains by the virtual machines satisfies a threshold utilization. In response to determining that the utilization of the first storage domain satisfies the threshold utilization, a second storage domain may be identified in view of a storage domain rank. An instruction may be provided to cause a storage migration of a virtual machine from the first storage domain to the identified second storage domain.

20 Claims, 6 Drawing Sheets

(56) References Cited

U.S. PATENT DOCUMENTS

| | | | |
|---|---|---|---|
| 8,782,658 B2* | 7/2014 | Ambat | G06F 9/45558 |
| | | | 709/223 |
| 9,158,940 B1 | 10/2015 | Suit | |
| 9,317,312 B2 | 4/2016 | Kondo et al. | |
| 9,563,463 B2 | 2/2017 | Innan et al. | |
| 9,645,841 B2 | 5/2017 | Ayanam et al. | |
| 10,042,555 B2 | 8/2018 | Crudele et al. | |
| 2007/0239979 A1* | 10/2007 | Berger | H04L 63/102 |
| | | | 713/150 |
| 2011/0066823 A1 | 3/2011 | Ando et al. | |
| 2015/0178019 A1* | 6/2015 | Hegdal | G06F 3/0664 |
| | | | 711/170 |
| 2016/0004552 A1* | 1/2016 | Innan | G06F 9/5088 |
| | | | 718/1 |
| 2016/0179432 A1 | 6/2016 | Niwa et al. | |
| 2016/0203015 A1* | 7/2016 | Joshi | G06F 9/45558 |
| | | | 718/1 |
| 2017/0364378 A1* | 12/2017 | Lipchuk | G06F 9/45558 |
| 2018/0157532 A1* | 6/2018 | Kumar | G06F 9/5027 |

OTHER PUBLICATIONS

Scott, Greg, Cannot Remove Snapshot. Low disk Space on Target Storage Domain, 2014, https://access.redhat.com/discussions/1120793.

Disk Libraries—Advanced, http://documentation.commvault.com/commvault/v10/article?p=features/disk_library/advanced.htm, accessed Aug. 15, 2017.

* cited by examiner

STORAGE DOMAIN GROWTH MANAGEMENT

TECHNICAL FIELD

The present disclosure is generally related to virtualization, and is more specifically related to managing the growth of storage domains associated with a host system.

BACKGROUND

Network virtualization may be software-emulated representations of physical network components of physical network infrastructure used to provide corresponding virtual network components to a host computer system. The host computer system may execute a host operating system (OS) to run an application container. A host computer system may also execute a hypervisor to run one or more virtual machines (VM). The host computer system may be used for network virtualization. The host computer system may include both physical and virtual network components to be used for network virtualization. Physical network components may include networking hardware such as routers, bridges, switches, and network interface cards (NICs) used to facilitate the transmission of data in a computer network. Virtual network components may be software-emulated representations of corresponding physical network components.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
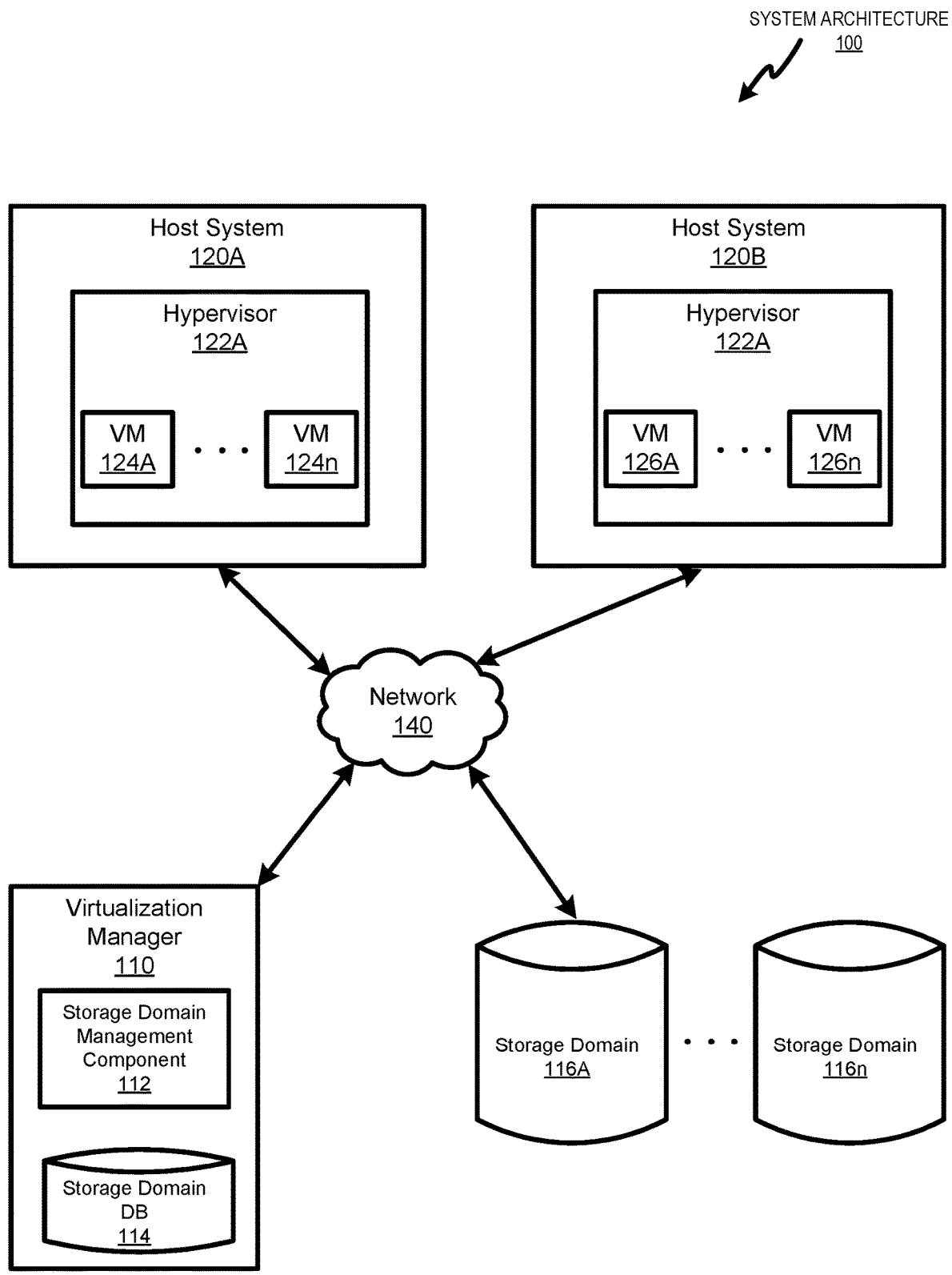
FIG. 1 depicts a high-level diagram of an example system architecture operating in accordance with one or more aspects of the present disclosure.

Aspects of the present disclosure relate to managing the growth of a storage domain in response to a utilization exceeding a storage threshold. Data centers may include host systems that are associated with one or more storage domains within the data center. For example, a host system may be communicatively coupled to multiple storage domains (e.g., storage domain A, storage domain B, storage domain C). Each of the storage domains may have a corresponding storage capacity. For example, storage domain A may have a storage capacity of 100 gigabytes (GB), storage domain B may have a storage capacity of 250 GB and storage domain C may have a storage capacity of 500 GB. The storage domains may be different types of storage that may have varying levels of performance. For example, storage domain A may be a first type of storage, storage domain B may be a second type of storage and storage domain C may be a third type of storage. Examples of types of storage domains may include, but are not limited to Network File System (NFS), Internet Small Computer Systems Interface (iSCSI), Fibre Channel Protocol (FCP), GlusterFS, Portable Operating System Interface (POSIX) and NetApp.

The host system may host multiple virtual machines (VMs) running on a hypervisor that is executed by a processing device of the host system. Each VM on the host system may be partitioned a particular amount of storage space on the storage domains associated with the host system. For example, a first VM may be partitioned 50 GB of space on storage domain A and a second VM may be partitioned 50 GB of space on storage domain A. The partitioned space may be used to store data associated with a VM, such as a guest operating system (OS), one or more snapshots of the VM, user files, software programs or the like. Each VM may use a portion of the partitioned space in a storage domain. For example, although the first VM is partitioned 50 GB of space on storage domain A, the first VM may only use 20 GB. Accordingly, to more efficiently utilize the storage space of a storage domain, the partitioned space of a storage domain may be over-allocated so that the partitioned space is greater than the storage capacity of the storage domain. For example, a storage domain having a storage capacity of 100 GB may host 4 VMs each having 30 GB of partitioned space. Therefore, the partitioned space of the 4 VMs would total 120 GB. Aside from storing data associated with VMs, the storage domains may also be utilized for other actions such as VM hibernation, VM and storage migrations and the like. As the data associated with the VMs and other actions increase, the available capacity of a storage domain decreases until the storage domain has reached its maximum capacity. When the amount of data stored on a storage domain (also referred to as "utilization" hereafter) exceeds the storage domain's maximum capacity, there may be resulting operational errors and erratic behavior by the data center. Because the amount of data associated with the VMs and other actions that is stored on a storage domain increase at varying rates, it is difficult to predict when a storage domain may reach its maximum capacity in order to prevent the utilization of a storage domain from exceeding the maximum capacity.

Accordingly, described herein are aspects to cause a storage migration of a VM in response to determining that a utilization of a storage domain satisfies a threshold utilization. The threshold utilization may correspond to an amount of storage capacity of a storage domain that is not to be utilized (e.g., does not include stored data). In an example, a virtualization manager may identify a host system associated with multiple storage domains that is executing multiple VMs. Subsequently, the virtualization manager may receive, from the host system, storage domain data that includes the utilization of each of the multiple storage domains by the VMs. The virtualization manager may determine that the utilization of a particular storage domain by the VMs satisfies a threshold utilization. In response to determining that the utilization of the particular storage domain satisfies the threshold utilization, the virtualization manager may identify another storage domain in view of a storage domain rank. The storage domain rank may correspond to a latency value of a respective storage domain. The virtualization manager may provide an instruction to the host system to cause a storage migration of a VM from the original storage domain to the other storage domain.

According to aspects of the disclosure, the virtualization manager may identify a host system associated with multiple storage domains that is executing multiple VMs. Subsequently, the virtualization manager may receive, from the host system, storage domain data that includes the utilization of each of the multiple storage domains by the VMs. The virtualization manager may determine that the utilization of a particular storage domain by the VMs satisfies a threshold utilization. In response to determining that the utilization of the particular storage domain satisfies the threshold utilization, the virtualization manager may identify a particular VM in view of a virtual machine rank. The virtualization manager may then determine another storage domain to receive a storage migration of the particular VM. The virtualization manager may then provide an instruction to the host system to cause a storage migration of the particular VM from the original storage domain to the other storage domain.

Thus, the aspects of the present disclosure may be advantageous because by maintaining an amount of storage capacity of a storage domain that is not utilized by using a threshold utilization, the probability that data being written to a storage domain exceeds its maximum capacity may be greatly reduced. For example, a storage domain having a storage capacity of 100 GB may have a threshold utilization of 10 GB. In the event that the amount of data stored exceeds 90 GB (100 GB capacity–10 GB threshold utilization), the virtualization manager may instruct the host system to perform a storage migration of a VM. By maintaining the 10 GB of unused storage capacity, the storage domain may be better equipped to handle a rapid increase in the utilization of the storage domain without exceeding its maximum capacity. This may result in an improvement of the performance of the host systems and VMs of the data center by preventing the occurrence of operational errors and erratic behavior that are the result of data being written to a storage domain exceeding the maximum capacity of the storage domain.

FIG. 1 illustrates an example system architecture 100 in which implementations of the disclosure may operate. The system architecture 100 may include a virtualization manager 110, multiple host systems 120A and 120B and storage domains 116A-n coupled via a network 140. The network 140 may be a public network (e.g., the Internet), a private network (e.g., a local area network (LAN) or wide area network (WAN)), or a combination thereof. Network 140 may include a wireless infrastructure, which may be provided by one or more wireless communications systems, such as a wireless fidelity (WiFi) hotspot connected with the network 140 and/or a wireless carrier system that can be implemented using various data processing equipment, communication towers, etc. Additionally or alternatively, network 140 may include a wired infrastructure (e.g., Ethernet).

Each of the host systems 120A and 120B may include one or more processors communicatively coupled to memory devices and input/output (I/O) devices. Each of the host systems 120A and 120B may run virtual machines 124A-n and 126A-n by executing hypervisors 122A and 122B, respectively, to abstract the physical layer, including processors, memory, and I/O devices, and present this abstraction to the virtual machines 124A-n and 126A-n as virtual devices. The virtual machines 124A-n and 126A-n may execute a guest operating system that may utilize the underlying virtual devices, including virtual processors, virtual memory, and virtual I/O devices. One or more applications may be running on a virtual machine under the guest operating system. The hypervisors 122A and 122B may create, run, manage, and monitor various aspects of virtual machines 124A-n and 126A-n operation, including the processing, and storage, memory, and network interfaces. In an illustrative example, hypervisors 122A and 122B may be provided by a Virtual Desktop and Server Management (VDSM) daemon (not shown). The VDSM daemon may include an application programming interface (API) with which the virtualization manager 110 interfaces.

The VDSM of each host system 120A and 120B may provide storage domain data to the virtualization manager. For example, the storage domain data may be provided by the VDSM in response to receiving an instruction from the virtualization manager to provide the storage domain data. The storage domain data may include a storage domain type, storage domain rank, storage domain capacity, storage domain utilization, VMs hosted by the storage domain and the like.

In certain implementations, host systems 120A and 120B may be grouped into one or more logical groups that may be also referred to as a "data center." A data center may represent the highest level of abstraction in a virtualization model. Each data center may be communicatively coupled, via the network 140, to one or more storage domains 116A-n storing disk images for machines, such as virtual machines 124A-n and 126A-n. In one implementation, storage domains 116A-n may be a distributed storage system for multiple VMs of the data center. In another implementation, storage domains 116A-n may be local memory devices installed on host systems 120A and 120B.

The virtualization manager 110 may be hosted by a computer system (described in more detail below with reference to FIG. 6) and include one or more computer programs executed by the computer system for centralized management of the system architecture 100. In one implementation, the virtualization manager 110 may include various interfaces, including administrative interface, reporting interface, and/or application programming interface (API) to communicate with host systems 120A and 120B of system architecture 100, as well as to user portals, directory servers, and various other components, which are omitted from FIG. 1 for clarity.

Virtualization manager 110 may include storage migration functionality that migrates a disk image of a VM from one storage domain to another storage domain. In one example, virtualization manager 110 may include a storage domain management component 112 and a storage domain database 114. The storage domain management component 112 may extract certain information, such as storage domain information (e.g., storage domain name, storage domain address, storage domain capacity, etc.), a set of configuration parameters (e.g., software packages, network settings, security settings, power management settings, etc.), and the like, and store the information in the storage domain database 114 for each existing host machine 120A and/or 120B.

The storage domain management component 112 may identify a host system that is executing multiple VMs and identify storage domains associated with the host system. The storage domain management component 112 may receive, from the host system, storage domain data including the utilization of each of the storage domains associated with the host system by the VMs and store the storage domain data in the storage domain database 114. The storage domain management component 112 may then determine the utilization of a particular storage domain associated with the host system satisfies a threshold utilization by searching the storage domain database 114 for a threshold utilization that corresponds to the particular storage domain and comparing the threshold utilization with the received storage domain data. Although host systems 120A and 120B are shown, it should be understood that any number of host systems may be included in a data center. According to some aspects of the present disclosure, as described below, the storage domain management component 112 may identify a new storage domain associated with the host system in view of a storage domain rank by searching the storage domain database 114 and identifying a storage domain rank for the new storage domain. The storage domain management component 112 may then provide an instruction to the host system that causes a storage migration of a VM from the original storage domain to the new storage domain.

According to other aspects of the present disclosure, the storage domain management component 112 may determine benchmarks for each of the storage domains of the data center, calculate a value in view of the benchmarks, assign a respective storage domain rank to each of the storage domains in view of the value and store the storage domain ranks on the storage domain database 114. Each benchmark may correspond, in part, to a latency value of a particular storage domain that is representative of a time delay between a request for data stored on the particular storage domain and the return of the requested data by the particular storage domain, where a lower latency value may indicate a higher performance level of the particular storage domain. For example, if a first storage domain has a latency value of 100 milliseconds (ms) and a second storage domain has a latency value of 50 ms, then the second storage domain may be operating at a higher performance level than the first storage domain. The benchmarks may also correspond storage domain capacity, storage domain available space, storage domain used space, storage system physical allocation percentage, storage system virtual allocation percentage and the like. In some implementations, a benchmark may correspond to the read and write speeds of a storage domain for different scenarios, including random and/or sequential data of varying sizes from various locations. A value may be calculated for each of the storage domains in view of the benchmarks. For example, a first storage domain having a higher latency value (e.g., lower performance level) may have a lower calculated value compared to a second storage domain having a lower latency value (e.g., higher performance level). In one implementation, the first storage domain may have a calculated value of 500, while the second storage domain may have a calculated value of 1000 points. In other implementations, storage domains having a higher performance level may have a lower value compared to storage domains having a lower performance level.

Using the calculated values, the storage domain management component 112 may assign a storage domain rank to each of the storage domains 116A-n. The storage domain ranks may correspond to defined ranges of values. For example, rank Z may correspond to a range of 0-500, rank Y may correspond to a range of 501-1000, rank X may correspond to a range of 1001-1500 and rank W may correspond to a range of 1501-2000. Therefore, using the previous example, the first storage domain having a value of 500 may be assigned rank Z, while the second storage domain having a value of 1000 may be assigned rank Y. In one implementation, the ranges may be defined by inputs from a system administrator. In some implementations, the storage domain management component 112 may provide a user interface (UI) for display to the system administrator. The UI may allow the system administrator to define quality of service entities that correlate the defined ranges with a naming convention. For example, rank Z may correlate to a "Bronze" naming convention, rank Y may correlate to a "Silver" naming convention and ranks X and W may correlate to a "Gold" naming convention. The UI may also receive inputs from the system administrator that correspond to threshold utilizations for each storage domain rank. For example, storage domains assigned rank Z and Y may have a threshold utilization of 10% of their total capacity, while storage domains assigned ranks X and W may have a threshold utilization of 15% of their total capacity.

Figure 2:
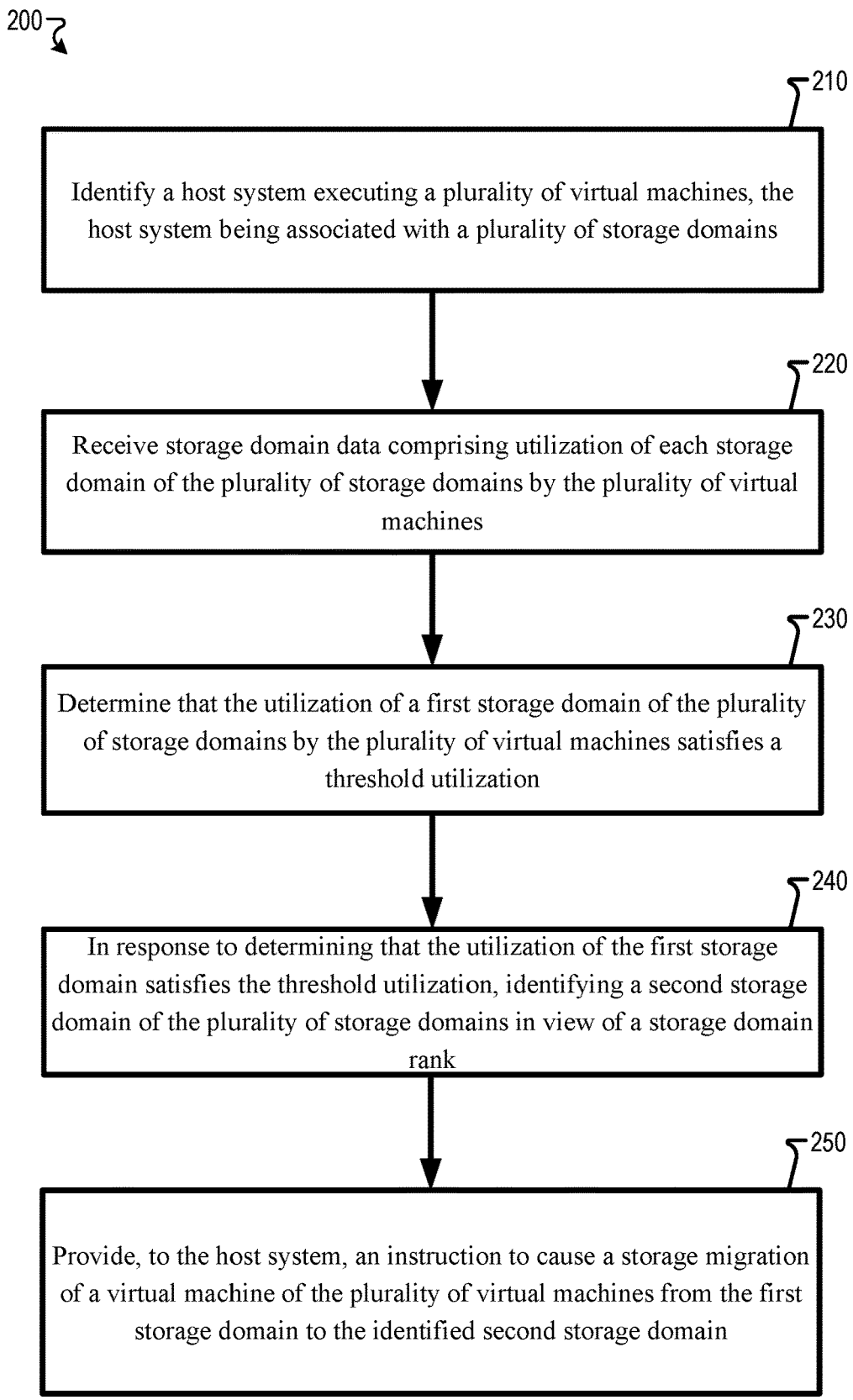
FIG. 2 depicts a flow diagram of an example method to cause a storage migration of a virtual machine in response to a utilization of a storage domain satisfying a threshold utilization in accordance with one or more aspects of the present disclosure.

FIG. 2 depicts a flow diagram of an example method 200 to cause a storage migration of a VM in response to a utilization of a storage domain satisfying a threshold utilization, according to implementations. The method 200 may be performed by a processing device that may include hardware (e.g., processing logic, circuitry, dedicated logic, programmable logic, microcode, etc.), software (e.g., instructions run or executed on a processing device), or a combination thereof. In general, the method 200 may be performed by the storage domain management component 112 of FIG. 1.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media.

Method 200 may begin with a processing device identifying a host system associated with multiple storage domains that is executing multiple VMs (block 210). The processing device may identify the host system by querying the storage domain database 114 of FIG. 1. The processing device may then receive storage domain data that includes the utilization of the storage domains by the VMs (block 220). The utilization of the storage domains may correspond to an amount of data being stored on the storage domains and the storage capacity of the storage domains. For example, the storage domain data of a storage domain may indicate that a storage domain is currently storing 95 GB of data and has a storage capacity of 100 GB. The storage domain data may be received from the host system at a defined time interval. The time interval may correspond to an amount of time that elapses in between receiving storage domain data from the host system. For example, if a host system has an assigned time interval of 10 seconds, then the processing device may receive storage domain data from the host system every 10 seconds. In some implementations, the time interval may be assigned as a result of an input from a system administrator. In other implementations, the time interval may be assigned by the processing device. In implementations, the time interval may be determined, by the processing device, in view of a number of VMs being hosted by a storage domain. For example, a storage domain hosting a large number of VMs may have a smaller time interval compared to a storage domain hosting a small number of VMs.

Subsequent to receiving the storage domain data, the processing device may determine that the utilization of a storage domain by the VMs satisfies a threshold utilization (block 230). The utilization of the storage domain may satisfy the threshold utilization when the amount of data being stored on the storage domain is equal to or exceeds a defined threshold utilization. In one implementation, the threshold utilization may be defined as an amount of data to remain unused on a storage domain. For example, the threshold utilization for a storage domain may be 10 GB. Therefore, the utilization of a storage domain having a storage capacity of 100 GB would satisfy the threshold utilization when the amount of data stored on the storage domain is equal to or exceeds 90 GB (e.g., the 100 GB storage capacity minus the 10 GB threshold utilization). In another implementation, the threshold utilization may be defined as a percentage of the total capacity of a storage domain. For example, the threshold utilization for a storage domain may be 15 percent. Therefore, the utilization of a storage domain having a storage capacity of 100 GB would satisfy the threshold utilization when the amount of data stored on the storage domain is equal to or exceeds 85 GB (e.g., the 100 GB storage capacity minus 15% of the storage capacity or 15 GB).

In further implementations, the threshold utilization may vary based on parameters of the storage domain. The threshold utilization may vary based on a number of VMs being hosted by the storage domain. For example, a storage domain hosting a larger number of VMs may have a larger threshold utilization compared to a storage domain hosting a smaller number of VMs. In other implementations, the threshold utilization may vary based on a determined rate of increase in the utilization of a storage domain. For example, a storage domain having a higher rate of increase in its utilization may have a higher threshold utilization compared to a storage domain having a lower rate of increase in its utilization.

In response to determining that the utilization of the first storage domain satisfies the threshold utilization, the processing device may identify a new storage domain associated with the host system in view of a storage domain rank (block 240). In one implementation, the new storage domain may be identified by having a higher rank compared to the other storage domains associated with the host system. For example, if a first storage domain associated with the host system has an assigned rank of W, while a second storage domain associated with the host system has an assigned rank of Z, then the processing device may identify the first storage domain.

After identifying the new storage domain, the processing device may provide an instruction to the host system to cause a storage migration of a VM hosted by the original storage domain to the new storage domain identified at block 240 (block 250). The storage migration of the VM may include copying data associated with the VM from the original storage domain to the new storage domain. After the data associated with the VM has been successfully copied to the new storage domain, the data on the original storage domain may be deleted. In one implementation, the processing device may determine that the new storage domain does not have resources, such as storage space, available to support the VM. For example, there may be 20 GB of data associated with the VM while the new storage domain may only have 15 GB of available storage space. In response to the processing device determining that the new storage domain does not have sufficient resources to support the VM, the processing device may identify another storage domain in view of the storage domain rank and provide another instruction to cause the storage migration of the VM from the original storage domain to the other storage domain having available resources to support the VM.

Figure 3:
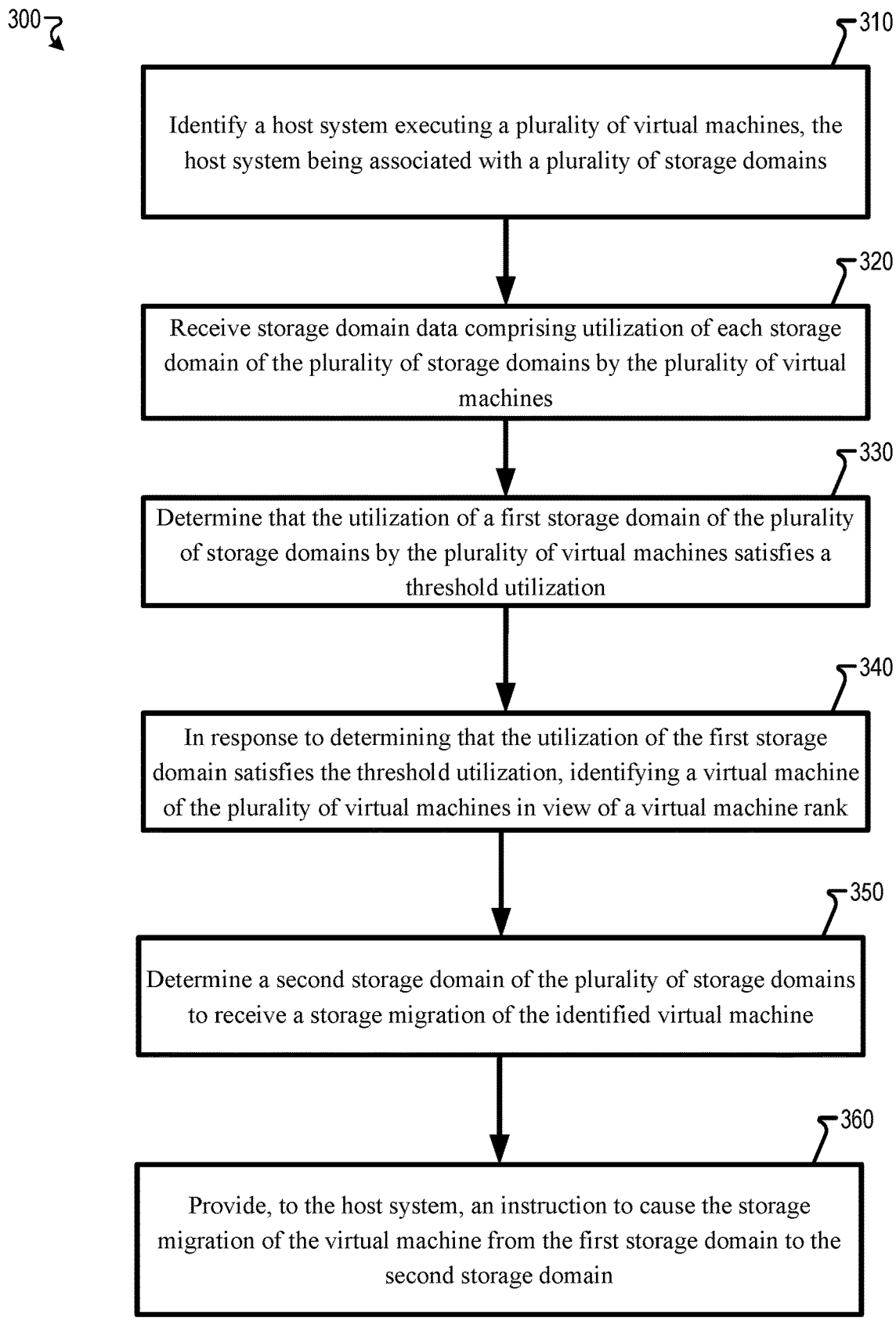
FIG. 3 depicts a flow diagram of an example method to cause a storage migration of a virtual machine that is identified in view of a virtual machine ranking in response to a utilization of a storage domain satisfying a threshold utilization in accordance with one or more aspects of the present disclosure.

FIG. 3 depicts a flow diagram of an example method 300 to cause a storage migration of a VM that is identified in view of a VM ranking in response to a utilization of a storage domain satisfying a threshold utilization. The method 300 may be performed by a processing device that may include hardware (e.g., processing logic, circuitry, dedicated logic, programmable logic, microcode, etc.), software (e.g., instructions run or executed on a processing device), or a combination thereof. In general, the method 300 may be performed by the storage domain management component 112 of FIG. 1.

Method 300 may begin with a processing device identifying a host system associated with multiple storage domains that is executing multiple VMs (block 310). The processing device may identify the host system by querying the storage domain database 114 of FIG. 1. The processing device may then receive storage domain data that includes the utilization of the storage domains by the VMs (block 320).

Subsequent to receiving the storage domain data, the processing device may determine that the utilization of a storage domain by the VMs satisfies a threshold utilization (block 330). The utilization of the storage domain may satisfy the threshold utilization when the amount of data being stored on the storage domain is equal to or exceeds a defined threshold utilization, as previously described. In response to determining that the utilization of the first storage domain satisfies the threshold utilization, the processing device may identify a VM of the VMs being hosted by the storage domain in view of a virtual machine rank (block 340). In one implementation, the VM rank may correspond to an amount of data associated with a respective VM. For example, a VM having a larger amount of data associated with it may have a higher VM rank than a VM having a smaller amount of data associated with it. Accordingly, the VM having the higher VM rank may be identified by the processing device for storage migration. In other embodiments, the VM rank may be assigned to the VMs by an input received by the processing device from a system administrator.

In some embodiments, the processing device may determine that a particular VM is assigned a protected status. The protected status may prevent the storage migration of the particular VM it is assigned to. In response to determining that the identified VM at block 340 is assigned a protected status, the processing device may identify a new VM in view of the VM rank that is not assigned the protected status. Once the new VM has been identified, the processing device may provide an instruction to the host system that causes the storage migration of the new VM from one storage domain to another storage domain.

Once a VM has been identified, the processing device may determine a new storage domain associated with the host system to receive the storage migration of the identified VM (block 350). In one implementation, the processing device may determine that the new storage domain does not have resources available to support the VM. In response to the processing device determining that the new storage domain does not have sufficient resources to support the VM, the processing device may identify another storage domain in view of the storage domain rank and provide another instruction to cause the storage migration of the VM from the original storage domain to the other storage domain having available resources to support the VM. In some implementations, the processing device may determine that none of the storage domains associated with the host system have resources available to support the VM. In response to determining that none of the storage domains have resources available to support the VM, the processing device may identify a new host system that is associated with at least one storage domain with the resources available to support the VM. The processing device may identify the new host system by searching the storage domain DB 114 for a host system that is associated with a storage domain with sufficient resources available to support the VM. Once a new host system has been identified, the processing device may provide an instruction to the original host system to cause the migration of the VM from the original host system to the new host system. The migrated VM may then be executed by the new host system.

After identifying the new storage domain, the processing device may provide an instruction to the host system to cause a storage migration of a VM hosted by the original storage domain to the new storage domain identified at block 350 (block 360). The storage migration of the VM may include copying data associated with the VM from the original storage domain to the new storage domain. After the data associated with the VM has been successfully copied to the new storage domain, the data on the original storage domain may be deleted.

Figure 4A:
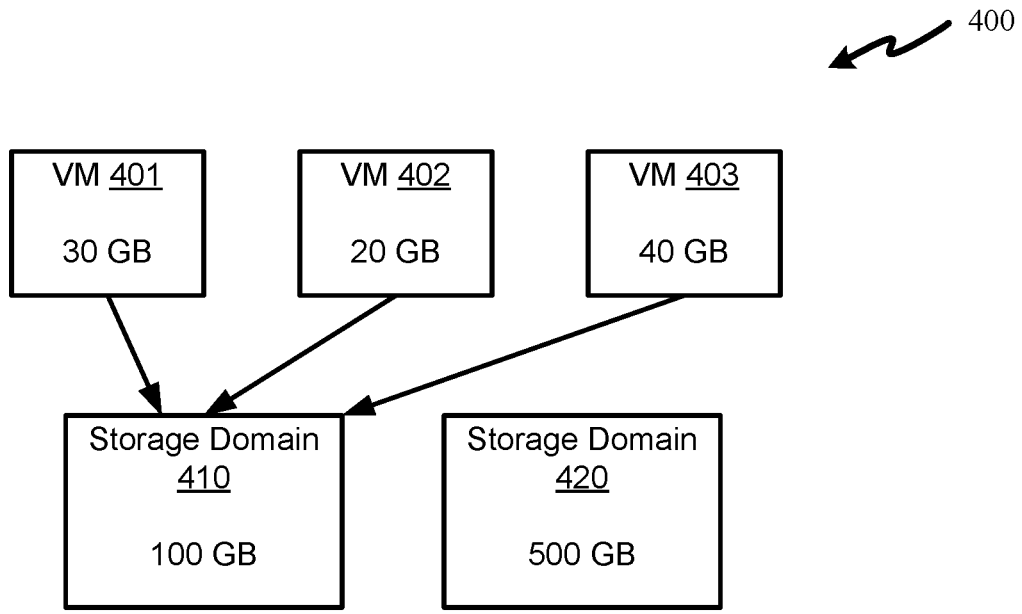
FIG. 4A illustrates virtual machines executed by a host system that are hosted by a first storage domain associated with the host system in accordance with one or more aspects of the present disclosure.
Figure 4B:
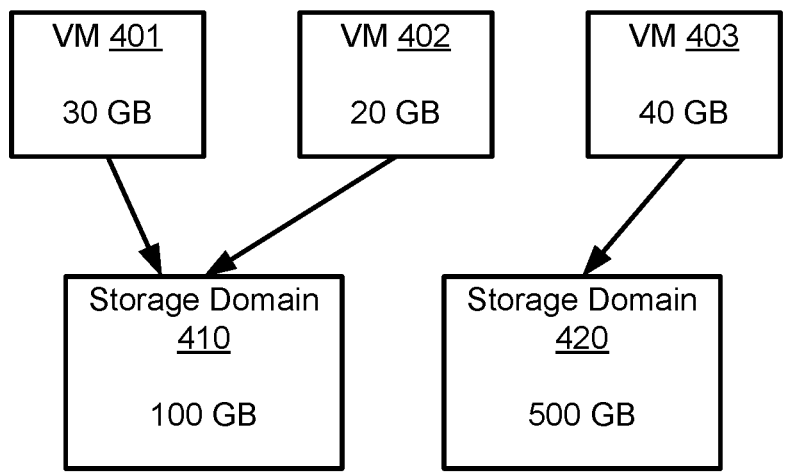
FIG. 4B illustrates identifying a virtual machine and causing a storage migration from one storage domain to another storage domain

FIGS. 4A and 4B are an illustration 400 to cause a storage migration of a VM in response to determining a utilization of a storage domain satisfies a threshold utilization, according to implementations. In some implementations, an instruction may be provided by the storage domain management component 112 of FIG. 1 to cause the storage migration of the VM.

FIG. 4A illustrates VMs executed by a host system that are hosted by a first storage domain associated with the host system, according to implementations. The VMs 401-403 and storage domains 410 and 420 may correspond to VMs 124A-n and/or 126A-n and storage domains 116A-n for FIG. 1, respectively. The VMs 401-403 may be executed by a host system such as host systems 120A and 120B of FIG. 1. Storage domains 410 and 420 may be associated with the host system executing VMs 401-403. In the present illustration, VM 401 has 30 GB of associated data, VM 402 has 20 GB of associated data and VM 403 has 40 GB of associated data. Storage domain 410 has a 100 GB storage capacity and storage domain 420 has a 500 GB capacity. In the current example, storage domain 410 has been assigned a threshold utilization of 90-percent.

Storage domain data may be received that is associated with VMs 401-403 and storage domains 410 and 420. Using the storage domain data, it may be determined that the utilization of storage domain 410 by VMs 401-403 is 90 GB (e.g., 30 GB+20 GB+40 GB). Then the utilization may be compared to the assigned threshold utilization (e.g., 90% of 100 GB) and it may be determined that the utilization of storage domain 410 satisfies the threshold utilization. It may be determined that a storage migration of one of VMs 401-403 from storage domain 410 is to be performed and a storage domain 420 to receive the storage migration in view of a storage domain rank may identified, as previously described.

FIG. 4B illustrates identifying a VM and causing a storage migration from one storage domain to another storage domain, according to implementations. In response to determining the threshold utilization has been satisfied, one of VMs 401-403 may be identified in view of a VM rank, as previously described. In the present illustration, the VM rank may be determined in view of the amount of data associated with a VM. Accordingly, VM 403 that has the largest amount of data associated with it may be identified for storage migration. Then, an instruction may be provided to the host system that causes the host system to perform a storage migration of VM 403 from storage domain 410 to storage domain 420, as previously described.

Figure 5:
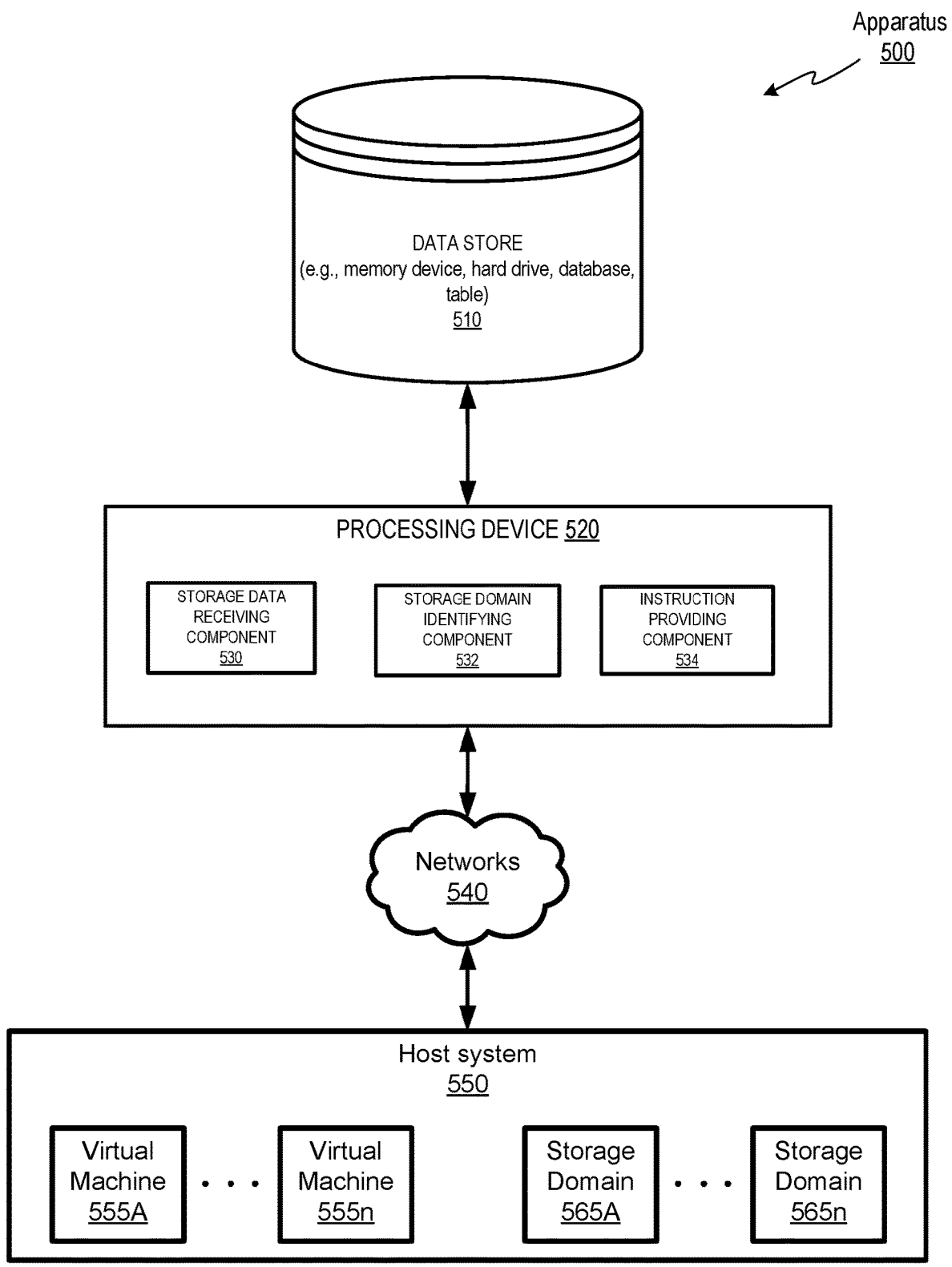
FIG. 5 illustrates an example apparatus in which implementations of the disclosure may operate in accordance with one or more aspects of the present disclosure.

FIG. 5 illustrates an example apparatus 500 in which implementations of the disclosure may operate. The apparatus 500 may be the same or similar to one of the distributed computing system, a network, or other computing devices. The data store 510 may include any non-persistent data storage (e.g., memory), persistent data storage (e.g., flash storage, hard drive, tape), another medium, or combination thereof that is capable of storing instructions for carrying out the operations of the components and module discussed herein. Furthermore, the data store 510 may store information (e.g., migration policy information).

The apparatus 500 may include a processing device 520. The processing device 520 may include a storage data receiving component 530, a storage domain identifying component 532, and an instruction providing component 534.

The storage data receiving component 530 may receive storage domain data from a host system of the data center. The storage data receiving component 530 may store the received storage domain data in the storage domain database 114. The storage domain identifying component 532 may identify storage domains to receive a storage migration of a VM. The storage domain identifying component 532 may also assign storage domain ranks to the storage domains, as previously described. The instruction providing component 534 may generate and provide an instruction to the host system that causes the storage migration of an identified virtual machine from one storage domain to another storage domain. The instruction providing component 534 may also provide instructions to the host system that causes the migration of a VM from one host system to another host system.

The apparatus 500 may further include a host system 550 that is executing multiple VMs 555A-n. The host system 550 may also be associated with multiple storage domains 565A-n. The host system 550 may be communicatively coupled to the processing device 520 via one or more networks 540.

Figure 6:
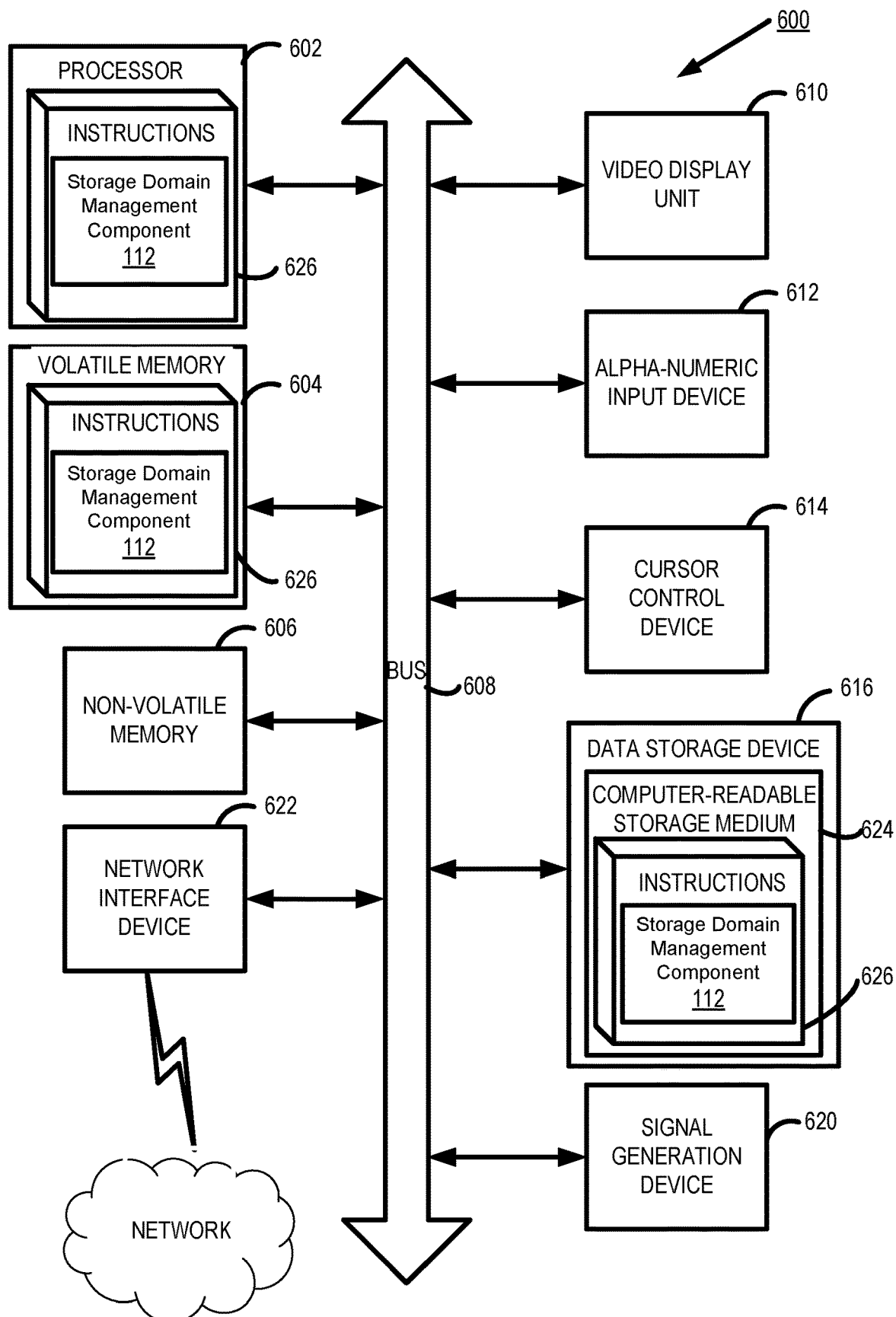
FIG. 6 depicts a block diagram of a computing system operating in accordance with one or more aspects of the present disclosure.

FIG. 6 depicts a block diagram of a computer system operating in accordance with one or more aspects of the present disclosure. In various illustrative examples, computer system 600 may correspond to a computing device within system architecture 100 of FIG. 1. The computer system 600 may host the virtualization manager 110. The computer system 600 may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical computing environment, but requests for a hard disk or memory may be managed by a virtualization layer of a host system to translate these requests to the underlying physical computing hardware resources. This type of virtualization results in multiple VMs sharing physical resources.

In certain implementations, computer system 600 may be connected (e.g., via a network, such as a Local Area Network (LAN), an intranet, an extranet, or the Internet) to other computer systems. Computer system 600 may operate in the capacity of a server or a client computer in a client-server environment, or as a peer computer in a peer-to-peer or distributed network environment. Computer system 600 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 600 may include a processing device 602, a volatile memory 604 (e.g., random access memory (RAM)), a non-volatile memory 606 (e.g., read-only memory (ROM) or electrically-erasable programmable ROM (EEPROM)), and a data storage device 616, which may communicate with each other via a bus 608.

Processing device 602 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 600 may further include a network interface device 622. Computer system 600 also may include a video display unit 610 (e.g., an LCD), an alpha-numeric input device 612 (e.g., a keyboard), a cursor control device 614 (e.g., a mouse), and a signal generation device 620.

Data storage device 616 may include a non-transitory computer-readable storage medium 624 on which may store instructions 626 encoding any one or more of the methods or functions described herein, including instructions encoding storage domain management component 112 of FIG. 1 for implementing methods 200 and 300.

Instructions 626 may also reside, completely or partially, within volatile memory 604 and/or within processing device 602 during execution thereof by computer system 600, hence, volatile memory 604 and processing device 602 may also constitute machine-readable storage media.

While computer-readable storage medium 624 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "receiving," "associating," "deleting," "initiating," "marking," "generating," "recovering," "completing," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 200 and 300, and/or each of their individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
   identifying a host system executing a plurality of virtual machines, the host system being associated with a plurality of storage domains, wherein the host system comprises an individual computing device;

receiving storage domain data comprising utilization of each storage domain of the plurality of storage domains by the plurality of virtual machines;

determining, by a processing device, that the utilization of a first storage domain of the plurality of storage domains by the plurality of virtual machines meets or exceeds a threshold utilization, wherein the first storage domain is associated with the host system;

in response to determining that the utilization of the first storage domain meets or exceeds the threshold utilization, identifying, in view of a virtual machine rank, a virtual machine of the plurality of virtual machines for a storage migration of the virtual machine, wherein the virtual machine rank reflects an amount of data associated with the virtual machine;

identifying a second storage domain of the plurality of storage domains in view of a storage domain rank, wherein the second storage domain is associated with the host system; and providing, to the host system, an instruction to cause the storage migration of the identified virtual machine of the plurality of virtual machines from the first storage domain associated with the host system to the identified second storage domain associated with the host system, wherein after the storage migration the host system continues to execute the virtual machine and the virtual machine is associated with the second storage domain.

2. The method of claim 1, wherein identifying the second storage domain of the plurality of storage domains in view of the storage domain rank comprises:

determining benchmarks associated with each of the plurality of storage domains;

calculating a value for each of the plurality of storage domains in view of the determined benchmarks; and assigning a respective storage domain rank to each of the plurality of storage domains in view of the calculated value.

3. The method of claim 2, wherein assigning the respective storage domain rank comprises:

identifying a plurality of storage domain ranks, each of the plurality of storage domain ranks corresponding to a defined range of values of a plurality of defined ranges;

determining that the calculated value is within a first defined range of the plurality of defined ranges corresponding to the respective domain storage rank; and selecting the respective storage domain rank for the second storage domain in view of the calculated value.

4. The method of claim 2, wherein a particular benchmark of the benchmarks associated with a particular storage domain of the plurality of storage domains corresponds to a latency of the particular storage domain.

5. The method of claim 1, further comprising:

determining that the second storage domain does not have resources available to support the virtual machine;

in response to determining that the second storage domain does not have sufficient resources, identifying a third storage domain of the plurality of storage domains in view of the storage domain rank; and providing, to the host system, a second instruction to cause the storage migration of the virtual machine from the first storage domain to the identified third storage domain.

6. The method of claim 1, further comprising:

determining that the virtual machine of the plurality of virtual machines is assigned a protected status; and in response to determining that the virtual machine is assigned the protected status, providing a second instruction to cause the storage migration of a second virtual machine of the plurality of virtual machines from the first storage domain to the identified second storage domain, wherein the second virtual machine is not assigned the protected status.

7. The method of claim 1, wherein receiving the storage domain data comprises:

receiving first storage domain data at a first time; and receiving second storage domain data at a second time that is determined in view of the first time and a time interval.

8. A system comprising:

a memory;

a processing device, operatively coupled with the memory, to:

identify a host system executing a plurality of virtual machines, the host system being associated with a plurality of storage domains, wherein the host system comprises an individual computing device;

receive storage domain data comprising utilization of each storage domain of the plurality of storage domains by the plurality of virtual machines;

determine that the utilization of a first storage domain of the plurality of storage domains by the plurality of virtual machines meets or exceeds a threshold utilization;

in response to determining that the utilization of the first storage domain meets or exceeds the threshold utilization, identify, in view of a virtual machine rank, a virtual machine of the plurality of virtual machines for a storage migration of the virtual machine, wherein the virtual machine rank reflects an amount of data associated with the virtual machine and wherein the first storage domain is associated with the host system;

determine a second storage domain of the plurality of storage domains to receive the storage migration of the identified virtual machine, wherein the second storage domain is associated with the host system; and provide, to the host system, an instruction to cause the storage migration of the virtual machine from the first storage domain associated with the host system to the second storage domain associated with the host system, wherein after the storage migration the host system continues to execute the virtual machine and the virtual machine is associated with the second storage domain.

9. The system of claim 8, wherein the virtual machine rank corresponds to an assigned priority of the virtual machine in view of the plurality of virtual machines.

10. The system of claim 8, wherein the processing device is further to:

determine that the virtual machine is assigned a protected status;

identify a second virtual machine of the plurality of virtual machines in view of the virtual machine rank that is not assigned the protected status; and provide, to the host system, a second instruction to cause the storage migration of the second virtual machine from the first storage domain to the second storage domain.

11. The system of claim 8, wherein the processing device is further to:

determine that the second storage domain does not have resources available to support the virtual machine;

in response to determining that the second storage domain does not have sufficient resources, identify a third storage domain of the plurality of storage domains in view of a storage domain rank; and provide, to the host system, a second instruction to cause the storage migration of the virtual machine from the first storage domain to the identified third storage domain.

12. The system of claim 8, wherein the processing device is further to:

determine that the second storage domain does not have resources available to support the virtual machine;

determine that none of the plurality of storage domains has the resources available to support the virtual machine;

in response to determining that none of the plurality of storage domains has the resources available to support the virtual machine, identify a second host system having at least one storage domain having the resources available to support the virtual machine; and provide, to the host system, a second instruction to cause the migration of the virtual machine from the host system to the identified second host system.

13. The system of claim 8, wherein to receive the storage domain data, the processing device is further to:

receive first storage domain data at a first time; and receive second storage domain data at a second time that is determined in view of the first time and a time interval.

14. A non-transitory computer readable storage medium having instructions that, when executed by a processing device, cause the processing device to:

identify a host system executing a plurality of virtual machines, the host system being associated with a plurality of storage domains, wherein the host system comprises an individual computing device;

receive storage domain data comprising utilization of each storage domain of the plurality of storage domains by the plurality of virtual machines;

determine that the utilization of a first storage domain of the plurality of storage domains by the plurality of virtual machines meets or exceeds a threshold utilization, wherein the first storage domain is associated with the host system;

in response to determining that the utilization of the first storage domain meets or exceeds the threshold utilization, identify, in view of a virtual machine rank, a virtual machine of the plurality of virtual machines for a storage migration of the virtual machine, wherein the virtual machine rank reflects an amount of data associated with the virtual machine;

identify a second storage domain of the plurality of storage domains in view of a storage domain rank, wherein the second storage domain is associated with the host system; and provide, to the host system, an instruction to cause the storage migration of the identified virtual machine of the plurality of virtual machines from the first storage domain associated with the host system to the identified second storage domain associated with the host system, wherein after the storage migration the host system continues to execute the virtual machine and the virtual is associated with the second storage domain.

15. The non-transitory computer readable storage medium of claim 14, wherein to identify the second storage domain of the plurality of storage domains in view of the storage domain rank, the processing device is further to:

determine benchmarks associated with each of the plurality of storage domains;

calculate a value for each of the plurality of storage domains in view of the determined benchmarks; and assign a respective storage domain rank to each of the plurality of storage domains in view of the calculated value.

16. The non-transitory computer readable storage medium of claim 15, wherein to assign the respective storage domain rank, the processing device is further to:

identify a plurality of storage domain ranks, each of the plurality of storage domain ranks corresponding to a defined range of values of a plurality of defined ranges;

determine that the calculated value is within a first defined range of the plurality of defined ranges corresponding to the respective domain storage rank; and select the respective storage domain rank for the second storage domain in view of the calculated value.

17. The non-transitory computer readable storage medium of claim 15, wherein a particular benchmark of the benchmarks associated with a particular storage domain of the plurality of storage domains corresponds to a latency of the particular storage domain.

18. The non-transitory computer readable storage medium of claim 14, the processing device further to:

determine that the second storage domain does not have resources available to support the virtual machine;

in response to determining that the second storage domain does not have sufficient resources, identify a third storage domain of the plurality of storage domains in view of the storage domain rank; and provide, to the host system, a second instruction to cause the storage migration of the virtual machine from the first storage domain to the identified third storage domain.

19. The non-transitory computer readable storage medium of claim 14, the processing device further to:

determine that the virtual machine of the plurality of virtual machines is assigned a protected status; and in response to determining that the virtual machine is assigned the protected status, provide a second instruction to cause the storage migration of a second virtual machine of the plurality of virtual machines from the first storage domain to the identified second storage domain, wherein the second virtual machine is not assigned the protected status.

20. The non-transitory computer readable storage medium of claim 14, wherein to receive the storage domain data, the processing device is further to:

receive first storage domain data at a first time; and receive second storage domain data at a second time that is determined in view of the first time and a time interval.

* * * * *